United States Patent
Cohen et al.

(10) Patent No.: US 6,637,661 B2
(45) Date of Patent: Oct. 28, 2003

(54) WIRELESS POINT-OF-SALE TERMINAL

(75) Inventors: Yitzhak Cohen, Yahud (IL); Avraham Galili, Bat-Yam (IL); Ephraim Chrolovich, Netanya (IL)

(73) Assignee: Lipman Electronic Engineering Ltd., Haayin (IL)

( * ) Notice: Subject to any disclaimer, the term of this patent is extended or adjusted under 35 U.S.C. 154(b) by 143 days.

(21) Appl. No.: 09/859,797

(22) Filed: May 17, 2001

(65) Prior Publication Data

US 2002/0170971 A1 Nov. 21, 2002

(51) Int. Cl.[7] .................................................. G06K 7/10
(52) U.S. Cl. ............................. 235/472.01; 235/472.02; 235/380
(58) Field of Search .................... 235/472.01, 472.02, 235/380; 400/618, 613.1, 613, 619, 88, 76

(56) References Cited

U.S. PATENT DOCUMENTS

| | | | | |
|---|---|---|---|---|
| 5,110,226 A | * | 5/1992 | Sherman et al. | 400/88 |
| 5,347,115 A | * | 9/1994 | Sherman et al. | 235/462.45 |
| 5,486,062 A | * | 1/1996 | Tsurumaru | 400/618 |
| 5,923,735 A | * | 7/1999 | Swartz et al. | 379/93.12 |
| 6,097,339 A | * | 8/2000 | Filipovic et al. | 343/702 |
| 6,234,389 B1 | * | 5/2001 | Valliani et al. | 235/380 |
| 6,270,271 B1 | * | 8/2001 | Fujiwara | 400/693 |
| 6,285,327 B1 | * | 9/2001 | See | 343/702 |
| 6,467,688 B1 | * | 10/2002 | Goldman et al. | 235/472.01 |

* cited by examiner

Primary Examiner—Michael G. Lee
Assistant Examiner—Kimberly Nguyen
(74) Attorney, Agent, or Firm—Ladas & Parry

(57) ABSTRACT

A wireless point of sale terminal including an operator interface, point of sale circuitry coupled to the operator interface, a printer coupled to the point of sale circuitry, a wireless transceiver coupled to the point of sale circuitry and a flexible antenna coupled to the wireless transceiver.

4 Claims, 2 Drawing Sheets

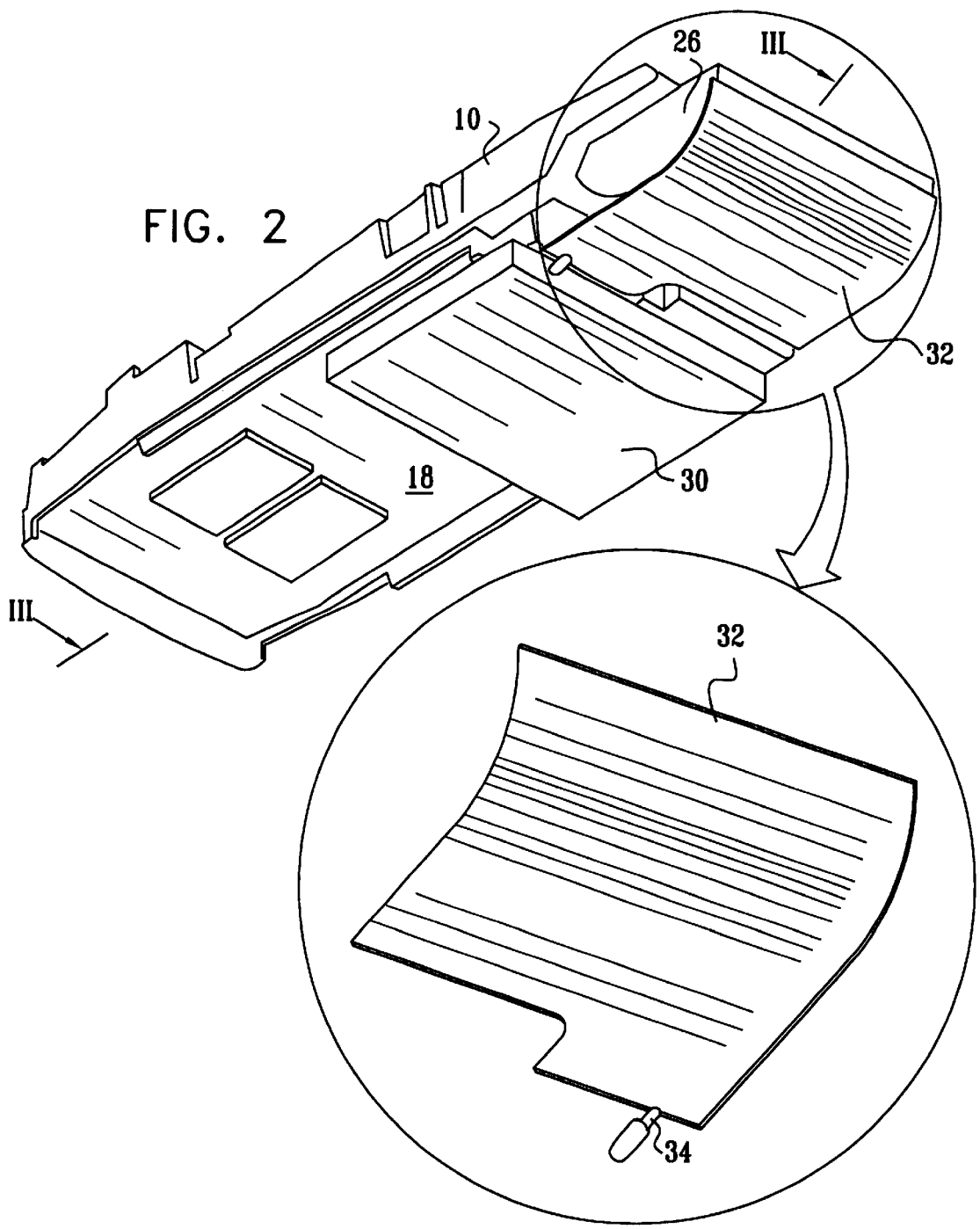
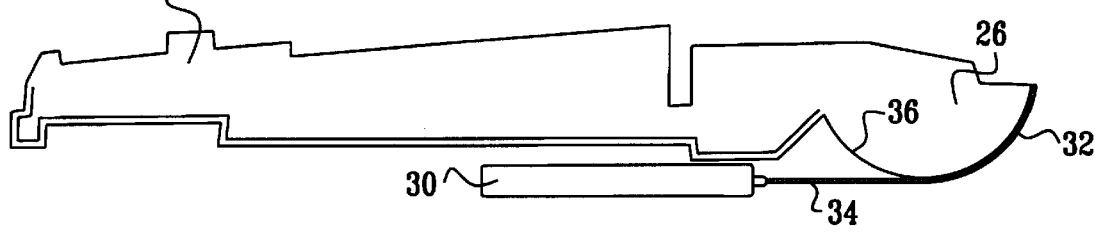

WIRELESS POINT-OF-SALE TERMINAL

FIELD OF THE INVENTION

The present invention relates to point of sale terminals generally and more particularly to hand-held point of sale terminals.

BACKGROUND OF THE INVENTION

Point of sale terminals are well known in the art and are widely used for credit card transactions. The present assignee is a major designer and manufacturer of such terminals.

Hand held and wireless point of sale terminals are also known.

SUMMARY OF THE INVENTION

The present invention seeks to provide an improved hand-held and wireless point of sale terminal.

There is thus provided in accordance with a preferred embodiment of the present invention a wireless point of sale terminal including an operator interface, point of sale circuitry coupled to the operator interface, a printer coupled to the point of sale circuitry, a wireless transceiver coupled to the point of sale circuitry and a flexible antenna coupled to the wireless transceiver.

In accordance with a preferred embodiment of the present invention, the flexible antenna is formed as part of the printer.

In a most preferred embodiment of the present invention, the printer includes a paper roll holder and the flexible antenna is mounted on a curved surface of the paper roll holder.

BRIEF DESCRIPTION OF THE DRAWINGS

The present invention will be understood and appreciated more fully from the following detailed description, taken in conjunction with the drawings in which:

FIG. 2 is a sectional illustration of the wireless point of sale terminal of FIG. 1, taken along the lines II—II in FIG. 1 and;

FIG. 3 is an illustration showing the mounting of the flexible antenna on the underside of a paper roll holder forming part of the point of sale terminal of FIGS. 1 and 2, taken along lines III—III in FIG. 2.

DETAILED DESCRIPTION OF A PREFERRED EMBODIMENT

Figure 1:
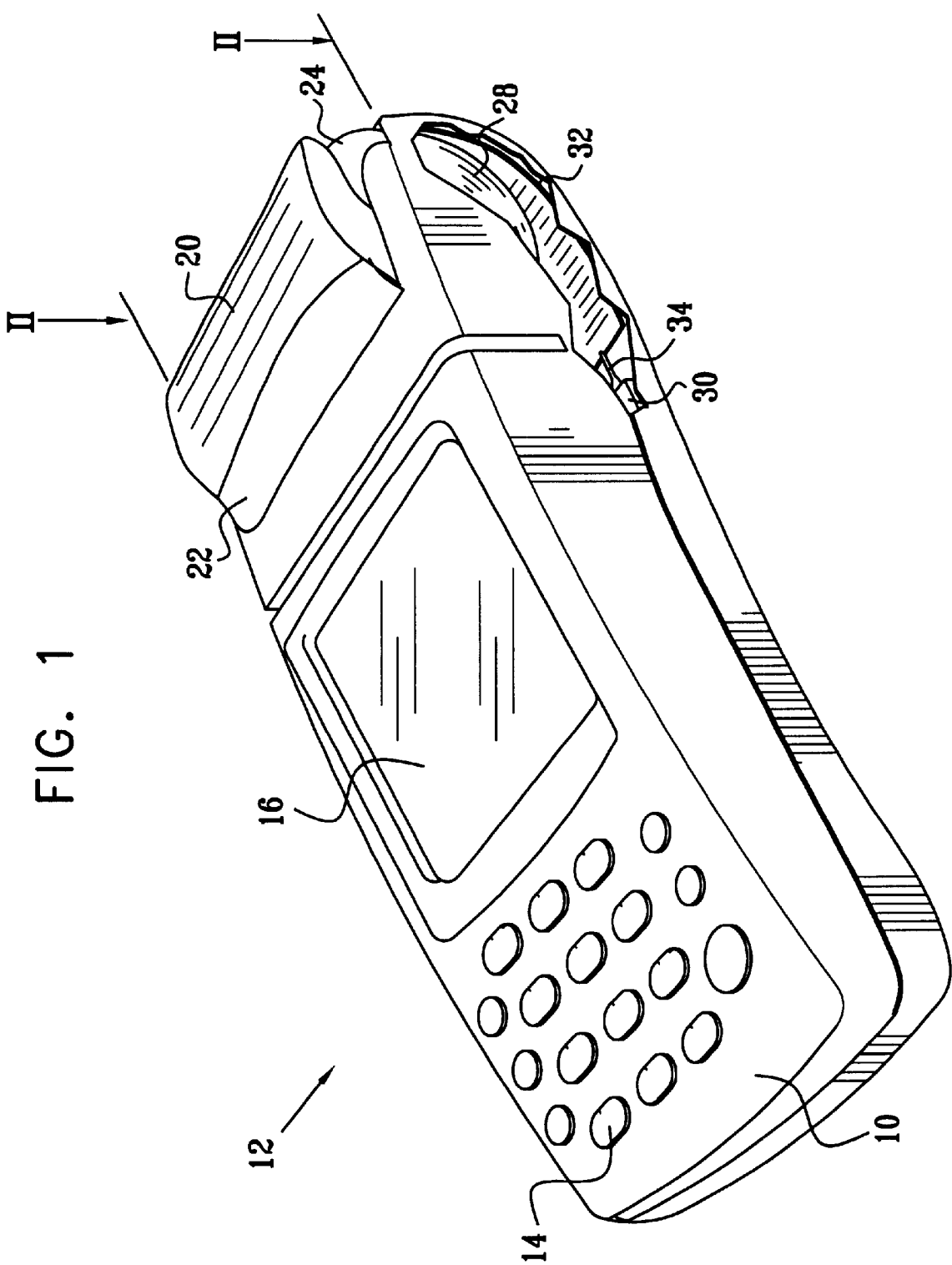
FIG. 1 is a general pictorial illustration of a wireless point of sale terminal constructed and operative in accordance with a preferred embodiment of the present invention.

Reference is now made to FIGS. 1, 2 and 3, which illustrate a wireless point of sale terminal constructed and operative in accordance with a preferred embodiment of the present invention. As seen particularly in FIGS. 1 and 2, the wireless point of sale terminal comprises a housing 10 which includes an operator interface, indicated generally by reference numeral 12 which typically comprises a keypad 14 and an operator display 16. The operator interface 12 is electronically coupled to point of sale circuitry 18, which may be entirely conventional.

Preferably, the wireless point of sale terminal also includes a printer 20, for printing receipts or other documents, which is operated by the point of sale circuitry 18. The printer preferably comprises a printing head 22 arranged to operatively engage a roll of paper 24, which is supported on a paper roll holder 26 and is driven by a paper feeder 28.

A wireless transceiver 30 is coupled to the point of sale circuitry, typically for communication with remote verification apparatus. In accordance with a preferred embodiment of the present invention an antenna 32 is coupled to the wireless transceiver 30. Antenna 32 is preferably a flexible antenna such as is commercially available from MARS Antennas and RF systems of Holon, Israel and is typically connected to the transceiver 30 by means of a coaxial cable 34, such as an RG-178 coaxial cable.

In accordance with a preferred embodiment of the present invention, the antenna is mounted on a curved underside surface 36 of the paper roll holder 26. This arrangement is particularly advantageous inasmuch as it requires nearly no space for the antenna 32, while providing it with substantial mechanical support.

It will be appreciated by persons skilled in the art that the present invention is not limited by what has been particularly shown and described hereinabove. Rather the scope of the present invention includes both combinations and subcombinations of the various features described hereinabove as well as variations and improvements therein as would occur to a person skilled in the art upon reading the foregoing description and which are not in the prior art.

What is claimed is:

1. A wireless point of sale terminal comprising:

a housing;

an operator interface;

point of sale circuitry coupled to the operator interface;

a printer disposed in said housing and coupled to the point of sale circuitry and including a paper roll holder at least partially spaced from said housing;

a wireless transceiver coupled to the point of sale circuitry; and a flexible antenna coupled to the wireless transceiver, said flexible antenna being mounted on a curved surface of the paper roll holder and disposed between said paper roll holder and said housing.

2. A wireless point of sale terminal according to claim 1 and wherein said flexible antenna is disposed alongside said printer.

3. A wireless point of sale terminal according to claim 1 and wherein said antenna is formed as part of the printer.

4. A wireless point of sale terminal according to claim 1 and wherein said flexible antenna is curved.

* * * * *